US006686010B2

(12) United States Patent
Ahn

(10) Patent No.: US 6,686,010 B2
(45) Date of Patent: Feb. 3, 2004

(54) WATERPROOF BAGS AND METHOD OF PRODUCING WATERPROOF BAGS

(76) Inventor: Soon-Keun Ahn, Park Town, Apt. 134-903, #55 Sune-dong, Bundang-ku, Seongnam-shi, Kyungki-do (KR)

( * ) Notice: Subject to any disclaimer, the term of this patent is extended or adjusted under 35 U.S.C. 154(b) by 0 days.

(21) Appl. No.: 09/955,976

(22) Filed: Sep. 20, 2001

(65) Prior Publication Data

US 2002/0068669 A1 Jun. 6, 2002

(30) Foreign Application Priority Data

Dec. 5, 2000 (KR) ................................ 10-2000-0073299

(51) Int. Cl.[7] .............................. B32B 1/08; B32B 7/04
(52) U.S. Cl. ................................ 428/36.1; 156/DIG. 6; 156/DIG. 19
(58) Field of Search ........................................ 428/36.1

(56) References Cited

U.S. PATENT DOCUMENTS 6,105,337 A 8/2000 Ahn ............................ 53/116

FOREIGN PATENT DOCUMENTS

KR 9109702 B * 11/1991

* cited by examiner

*Primary Examiner*—Sandra M. Nolan
(74) *Attorney, Agent, or Firm*—Birch, Stewart, Kolasch & Birch, LLP

(57) ABSTRACT

A waterproof bag and a method of producing the waterproof bag are disclosed. The method includes applying first and second waterproof films respectively onto first and second outer surfaces of a base component, such that the base component includes first and second non-laminated outer surface areas; refolding the base component so as to position the first and second non-laminated outer surface areas in certain regions of the base component; and applying third and forth waterproof films respectively onto the first and second non-laminated outer surface areas of the base component and onto first and second end portions of the first and second waterproof films.

8 Claims, 5 Drawing Sheets

WATERPROOF BAGS AND METHOD OF PRODUCING WATERPROOF BAGS

RELATED APPLICATION

The present application claims the benefit of Korean Patent Application No. 10-2000-0073299 filed on Dec. 5, 2000, which is herein fully incorporated by reference.

BACKGROUND OF THE INVENTION

1. Field of the Invention

The present invention relates to bags and a method of producing the bag and, more particularly, to cylindrical (i.e., cylindrically-shaped) waterproof bags and a method of producing the same, wherein the bags have improved aesthetics and functionality.

2. Description of Related Art

Conventionally, synthetic resin yarns made of materials such as PP or PE (polyester) are weaved into cylindrical bags using circular weaving machines. These cylindrical bags are composed of yarns extending in a longitude/lengthwise direction which are intertwined with yarns extending in a latitude/widthwise direction, such as in a net. However, such cylindrical bags have gaps between these yarns, rendering them unsuitable as waterproof bags.

To transform such bags into waterproof bags, waterproof films are applied to the outer surface of the bag. FIG. 1 illustrates an example of one such conventional cylindrical waterproof bag 150. As shown in FIG. 1, the cylindrical waterproof bag 150 includes a cylindrically woven fabric 100, and two waterproof films 200 laminated to the outer surface of the woven fabric 100. Particularly, in the fabrication method, the cylindrically woven fabric 100 is laid flat and wrapped around a bobbin. Then the cylindrically woven fabric 100 is unwound from the bobbin and passed through a conventional film compressor to adhere two waterproof films 200 on the opposite sides of the outer surface of the woven fabric 100 to fabricate the cylindrical waterproof bag 150. Although effective, however, there are problems associated with the cylindrical waterproof bag 100. As shown, the cylindrical waterproof bag 100 includes a pair of projections 201 that are created at the ends where the two waterproof films 200 meet. Such projections 201 render the bag 150 less attractive and less functional. In addition, in cold weather environments, the projections 201 either freeze or become stiff and can cut fingers when the bags 150 are handled. These problems limit the practical use of the waterproof bags 150.

Further, cylindrical bags made of vinyl are generally used if the bags need printing on the outer surface of the bags, e.g., for advertisement purposes. However, such bags are not durable and often cannot be re-used.

Therefore, there is a need for a waterproof bag and a method of producing the waterproof bag that can overcome the above laminations and other problems associated with conventional waterproof bags and methods of producing the waterproof bags. Particularly, a need exists for a waterproof bag with improved waterproofing functionality, aesthetics and durability.

SUMMARY OF THE INVENTION

Accordingly, an object of the present invention is to provide a waterproof bag and a method of producing the waterproof bag, which overcome problems associated with conventional waterproof bags and conventional methods of producing the waterproof bags.

Another object of the present invention is to provide a waterproof bag and a method of producing the same, wherein the waterproof bag has improved waterproofing functionality, improved aesthetics and improved durability with good printing quality.

In one embodiment, the present invention is directed a method of producing a waterproof object, the method comprising the steps of first applying first and second waterproof films respectively onto first and second outer surfaces of a base component, such that the base component includes first and second non-laminated outer surface areas; refolding the base component so as to position the first and second non-laminated outer surface areas in certain regions of the base component; and second applying third and fourth waterproof films respectively onto the first and second non-laminated outer surface areas of the base component and onto first and second end portions of the first and second waterproof films.

The present invention is also directed to a waterproof object comprising a base component having first, second, third and fourth outer surfaces; first and second waterproof films respectively disposed on the first and second outer surfaces of the base component, such that the third and fourth outer surfaces are devoid of the first and second waterproof films; and third and fourth waterproof films respectively disposed on the third and fourth outer surfaces of the base component and over first and second end portions of the first and second waterproof films.

Furthermore, the present invention is directed to a waterproof bag comprising a woven base component; at least one waterproof film adhered to an inner surface of the base component; and a photo film adhered to an outer surface of the base component to produce the waterproof bag.

Moreover, the present invention is directed to a system for producing a waterproof object using a base component, the system comprising a first application section for respectively applying first and second waterproof films onto first and second outer surfaces of the base component, such that the base component includes first and second non-laminated outer surface areas; a refolding section for refolding the base component so as to position the first and second non-laminated outer surface areas in certain regions of the base component; and a second application section for respectively applying third and fourth waterproof films onto the first and second non-laminated outer surface areas of the base component and onto first and second end portions of the first and second waterproof films.

BRIEF DESCRIPTION OF THE DRAWINGS

The present invention will become more fully understood from the detailed description given hereinbelow and the accompanying drawings which are given by way of illustration only, wherein reference numerals designate corresponding parts in the various drawings and wherein.

DETAILED DESCRIPTION OF THE PREFERRED EMBODIMENTS

Figure 2:
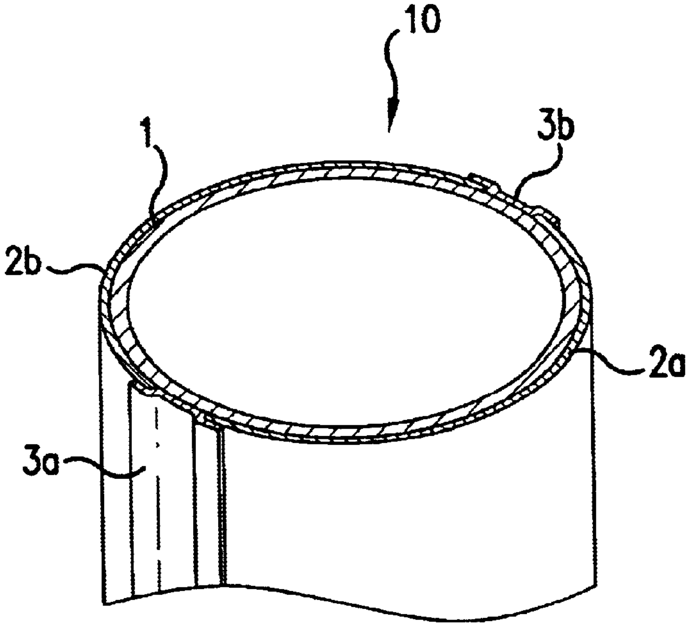
FIG. 2 is a perspective view of a cylindrical waterproof bag according to one embodiment of the present invention.

FIG. 2 is an example of a cylindrical waterproof bag 10 according to one embodiment of the present invention. As shown in FIG. 2, the cylindrical waterproof bag 10 includes a cylindrically woven fabric 1, first and second waterproof films 2*a* and 2*b* laminated to the opposite first and second outer surfaces of the woven fabric 1, and third and fourth waterproof films 3*a* and 3*b* adhered over the opposite third and fourth outer surfaces of the woven fabric 1 and over the end portions of the first and second waterproof films 2*a* and 2*b*. The first and second waterproof films 2*a* and 2*b* are symmetrically opposed from each other, and the third and fourth waterproof films 3*a* and 3*b* are symmetrically opposed from each other. The woven fabric 1 is formed of synthetic resin yarns made of known materials, e.g., PP, PE, etc., and may be weaved using conventional techniques or conventional circular weaving machines. The woven fabric may be weaved in a net configuration wherein synthetic yarns extend in a longitude/lengthwise direction and are intertwined with other synthetic yarns extending in a latitude/widthwise direction.

To provide enhanced waterproofing characteristics, the third and fourth waterproof films 3*a* and 3*b* overlap end portions of the first and second waterproof films 2*a* and 2*b*. In this embodiment, the first and second waterproof films 2*a* and 2*b* cover much greater surface than the third and fourth waterproof films 3*a* and 3*b*. That is, the first and second outer surfaces of the woven fabric 1 are larger in size than the third and fourth outer surfaces of the woven fabric 1. In another embodiment, the first and second waterproof films 2*a* and 2*b* may be smaller in size than the third and fourth waterproof films 3*a* and 3*b*, if needed.

In one embodiment, the waterproof films 2*a* and 2*b* can be preprinted with photographic images or other graphical images for providing advertisements and other aesthetical characteristics to the cylindrical bag 10 as desired. In fact, any information and/or image may be provided on or as part of the first and second waterproof films 2*a* and 2*b* using any known technique. In another embodiment, a photo film containing images, printing, or the like can be adhered or laminated to an outer surface of at least one of the first through fourth waterproof films 2*a*, 2*b*, 3*a* and 3*b*. This results in a waterproof bag with improved printing quality. Further, since the first to fourth waterproof films 2*a*, 2*b*, 3*a* and 3*b* cover the entire outer surface of the woven fabric 1, the waterproofing functionality of the bag 10 is greatly improved. Moreover, since the first through fourth waterproof films 2*a*, 2*b*, 3*a* and 3*b* are applied to the outer surface of the woven fabric 1 in a way that eliminates projections 120 of conventional cylindrical waterproof bags, the aesthetics and safety of the waterproof bag 10 are improved significantly.

Figure 3A:
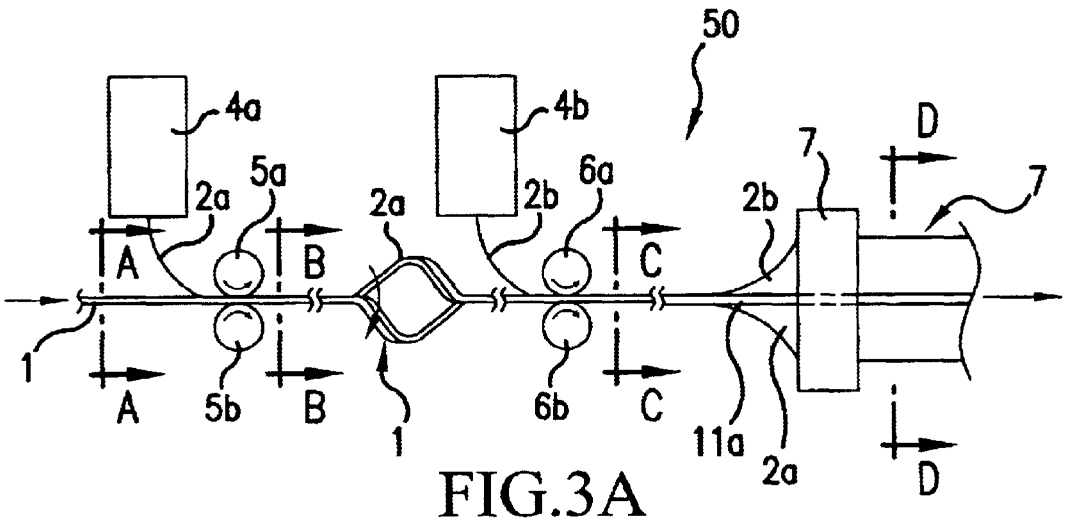
FIGS. 3A and 3B are diagrams of a system for producing a cylindrical waterproof bag according to one embodiment of the present invention.
Figure 3B:
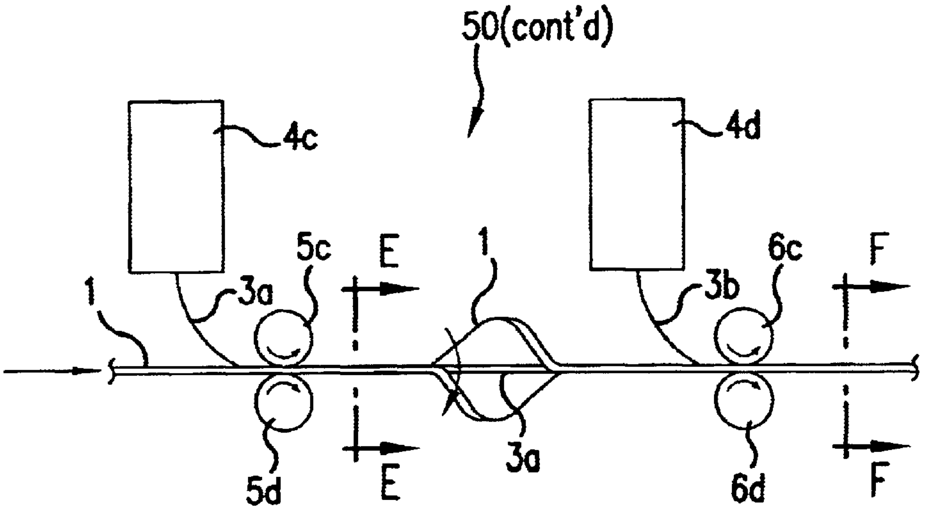

A method of producing the cylindrical waterproof bag 10 according to one embodiment of the present invention is as follows. This method can be implemented using a system 50 for producing cylindrical waterproof bags as shown in FIGS. 3A and 3B. In this method, first, the woven fabric 1 is provided by weaving synthetic yarns or the like using any conventional circular weaving machine or existing techniques. Then the woven fabric 1 is passed to the system 50 which transforms the woven fabric 1 into a waterproof bag according to the embodiments of the present invention. Prior to being processed by the system 50, the woven fabric 1 may be flattened, e.g., by being passed through a pair of stamp rollers. Then the flattened woven fabric 1 can be transported directly from the circular weaving machine to the system 50, or can be wound unto a bobbin and subsequently unwound from the bobbin and supplied to the system 50 at an appropriate time. The woven fabric 1 functions as a base component unto which waterproof films can be applied to produce a waterproof bag.

Figure 4:
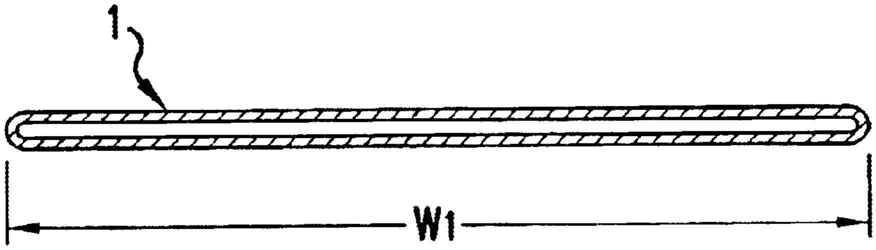
FIG. 4 is a cross-sectional view of a bag, cut along line A—A of FIG. 3A, according to one embodiment of the present invention.

Referring now to FIG. 3A, the flattened woven fabric 1 enters the system 50 where FIG. 4 shows a cross-sectional view of the woven fabric 1 at this time, cut along line A—A of FIG. 3A. The flattened or folded woven fabric 1 has a width of W1.

Then a first lamination process of the method is performed. Particularly, in the first lamination process, a first waterproof film 2*a* is applied to a first outer surface S1 of the woven fabric 1 using a first film compressor 4*a*. The first film compressor 4*a* laminates the first waterproof film 2*a* onto the first outer surface S1 according to existing lamination techniques. For example, the first waterproof film 2*a* is laminated to the woven fabric 1 using T-dice. In the alternative, the first waterproof film 2*a* may be adhered to the first outer surface S1 using other existing material adherence techniques. Then the woven fabric 1 laminated with the first waterproof film 2*a* is passed between a pair of transport rollers 5*a* and 5*b*. The transport rollers 5*a* and 5*b* can apply pressure to the laminated waterproof film 2*a* to further secure the lamination. In one embodiment, the upper transport roller 5*a* can include a known water-cooling or air-cooling roller for enhancing the close adherence of the waterproof film 2*a* to the first outer surface Si of the woven fabric 1. This completes the first lamination process.

Figure 5:
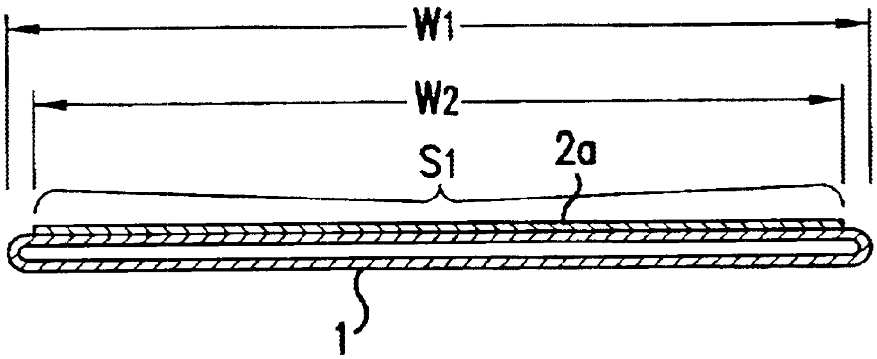
FIG. 5 is a cross-sectional view of a bag, cut along line B—B of FIG. 3A, according to one embodiment of the present invention.

FIG. 5 shows a cross-sectional view of the woven fabric 1 after the first lamination process is completed, cut along line B—B of FIG. 3A. As shown in FIG. 5, the width W1 of the folded woven fabric 1 is slightly greater than the width W2 of the first outer surface S1 of the woven fabric 1. This feature is advantageous and important because it allows the system 50 to compensate for slight differences between different cylindrically-woven fabrics produced by the same or different circular weaving machines. For example, it is well known that one circular weaving machine may produce cylindrically woven fabrics of slightly-different widths due to machine characteristics. In this case, the width W2 can be selected appropriately so as to compensate for these differences without exceeding the width of any cylindrically woven fabric.

Figure 6:
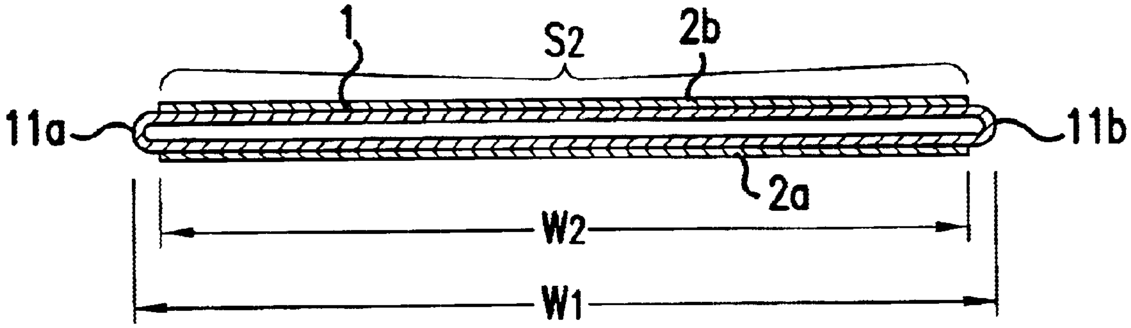
FIG. 6 is a cross-sectional view of a bag, cut along line C—C of FIG. 3A, according to one embodiment of the present invention.

Then, a second lamination process of the method is performed as follows. The woven fabric 1 as shown in FIG. 5 is basically flipped or rotated at 180° so that a second waterproof film 2*b* can be applied to a second outer surface thereof, where the first and second outer surfaces S1 and S2 are positioned at opposite sides of the woven fabric 1. Particularly, returning to FIG. 3A, the system 50 flips in a U-direction, or rotates the woven fabric 1 at 180° using any known means or technique, so that the second outer surface S2 of the woven fabric 1 is now above the first outer surface S1 of the woven fabric 1. Then a second film compressor 4*b* applies the second waterproof film 2*b* onto the second outer surface S2 of the woven fabric 1 using existing lamination techniques. The second outer surface S2 of the woven fabric 1 has the same width W2 as the first outer surface S1. Then the laminated woven fabric 1 is passed between a pair of transport rollers 6*a* and 6*b*. Similarly to the transport rollers 5*a* and 5*b*, the transport rollers 6*a* and 6*b* can apply pressure to the laminated waterproof film 2*b* to further secure the lamination. In one embodiment, the upper transport roller 6*a* can include a known water-cooling or air-cooling roller for enhancing the close adherence of the second waterproof film 2*b* to the second outer surface S2 of the woven fabric 1. This completes the second lamination process, and the woven fabric 1 laminated with the first and second waterproof films 2*a* and 2*b* is thereby produced as shown in FIG. 6 which shows a cross-sectional view of the woven fabric 1, cut along line C—C of FIG. 3A. It should be noted that, at this time, the woven fabric 1 as shown in FIG. 6 has portions 11*a* and 11*b* that have not been laminated with any waterproof film, whereas the entire first and second outer surfaces S1 and S2 of the woven fabric 1 are covered with the first and second waterproof films 2*a* and 2*b*, respectively.

Figure 7:
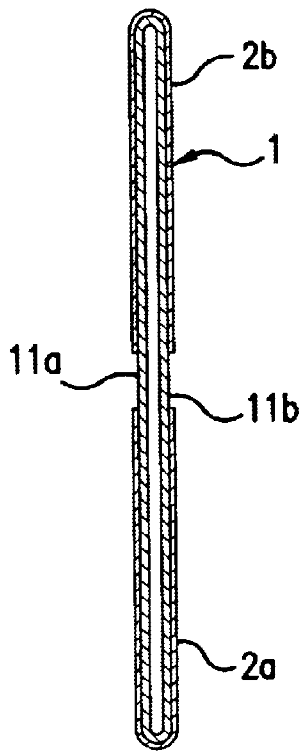
FIG. 7 is a cross-sectional view of a bag that has been refolded, cut along line D—D of FIG. 3A, according to one embodiment of the present invention.

Then, the flattening/folding direction of the woven fabric 1 is changed using existing techniques and/or components, e.g., guide rollers 7. FIG. 7 shows a cross-sectional view of the woven fabric 1, cut along line D—D of FIG. 3A, after the woven fabric 1 is flattened in a different direction. Particularly, as shown in FIG. 7, the woven fabric 1 is flattened or folded in a direction perpendicular or substantially perpendicular to the existing flattening/folding direction of the woven fabric 1 of FIG. 6, such that now, the non-laminated portions 11*a* and 11*b* of the woven fabric 1 are placed in middle regions of the woven fabric 1. In other words, the folding direction of the woven fabric 1 is changed 90 degrees from the existing folding direction of the woven fabric 1.

Although it is preferred to have the non-laminated portions 11*a* and 11*b* of the fabric 1 in the middle regions thereof because of improved efficiency in subsequent (third and fourth) lamination processes, it is acceptable to have the non-laminated portions 11*a* and 11 outside the middle regions of the fabric 1 as long as the subsequent lamination processes are modified to provide appropriate lamination to these portions 11*a* and 11*b*.

Once the flattening/folding direction of the woven fabric 1 is changed as discussed above, the method applies third and then fourth lamination processes as follows. In the third lamination process, as shown in FIG. 3B, a third waterproof film 3*a* is applied to a third outer surface S3 of the woven fabric 1 using a third film compressor 4*c*. That is, the third waterproof film 3*c* covers the non-laminated portion 11*a* of the fabric 1 as well as end portions of the first and second waterproof films 2*a* and 2*b*. The third film compressor 4*c* laminates the third waterproof film 3*a* onto the third outer surface S3 according to existing lamination techniques, similarly to the first or second lamination process. Then the woven fabric 1 laminated with the third waterproof film 3*a* is passed between a pair of transport rollers 5*c* and 5*d*. The transport rollers 5*c* and 5*d* can apply pressure to the laminated waterproof film 3*a* to further secure the lamination. In one embodiment, the upper transport roller 5*c* can include a known water-cooling or air-cooling roller for enhancing the close adherence of the waterproof film 3*a* to the third outer surface S3 of the woven fabric 1. This completes the third lamination process.

Figure 8:
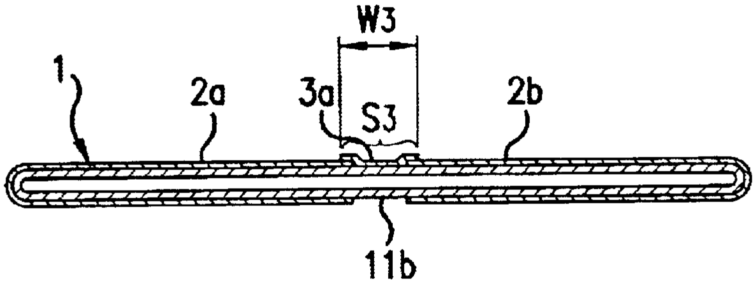
FIG. 8 is a cross-sectional view of a bag, cut along line E—E of FIG. 3B, according to one embodiment of the present invention.

FIG. 8 shows a cross-sectional view of the woven fabric 1 after the third lamination process is completed, cut along line E—E of FIG. 3B. As shown in FIG. 8, the width W3 of the third outer surface S3 of the woven fabric 1 is selected appropriately so that it covers the non-laminated portion 11*a* and the end portions of the first and second waterproof films 2*a* and 2*b*.

Then, a fourth lamination process of the method is performed as follows. Similarly to the flipping or rotation process discussed above, the woven fabric 1 as shown in FIG. 8 is flipped or rotated at 180° so that a fourth waterproof film 3*b* can be applied to a fourth outer surface S4 of the woven fabric 1. The third and fourth outer surfaces S3 and S4 are at opposite sides of the woven fabric 1. Particularly, referring to FIG. 3B, the system 50 flips in a U-direction or rotates the woven fabric 1 at 180° using any technique so that the fourth outer surface S4 of the woven fabric 1 is now above the third outer surface S3 of the woven fabric 1. Then a fourth film compressor 4*d* applies the fourth waterproof film 3*b* onto the fourth outer surface S4 of the woven fabric 1 using existing lamination techniques. The fourth outer surface S4 of the woven fabric 1 has the same width W3 as the third outer surface S3, and the fourth waterproof film 3*b* covers the non-laminated portion 11*b* of the woven fabric 1 as well as the end portions of the first and second waterproof films 2*a* and 2*b*.

Figure 1:
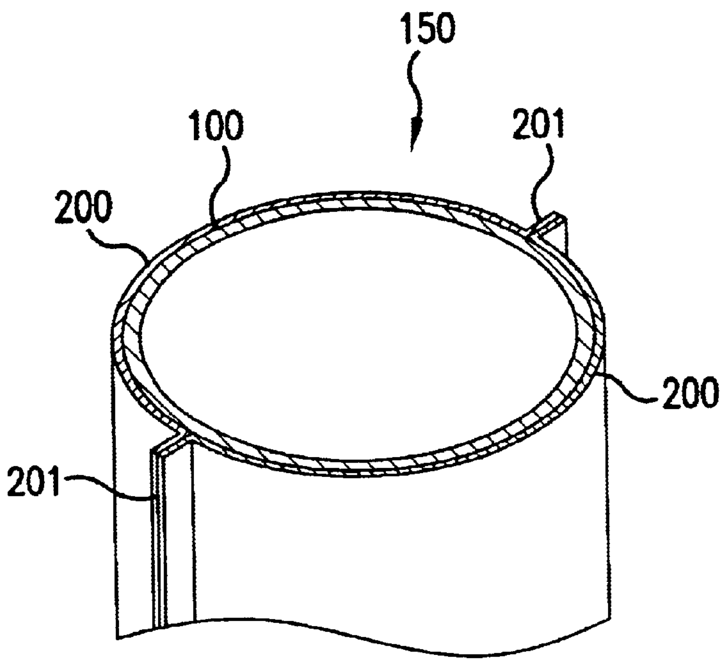
FIG.1 CONVENTIONAL ART
FIG. 1 is a perspective view of a conventional cylindrical waterproof bag.
Figure 9:
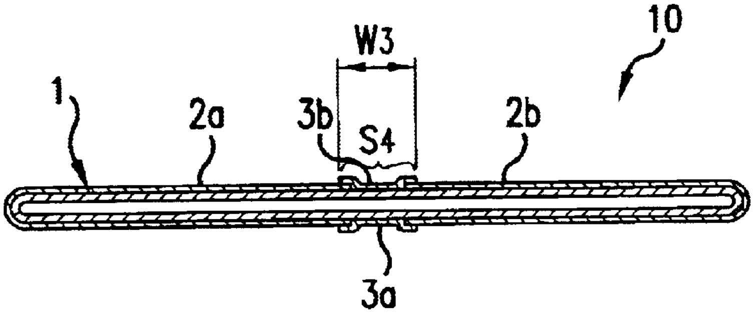
FIG. 9 is a cross-sectional view of a bag, cut along line F—F of FIG. 3B, according to one embodiment of the present invention.

Then the laminated woven fabric 1 is passed between a pair of transport rollers 6*c* and 6*d*. Similarly to the transport rollers 5*c* and 5*d*, the transport rollers 6*c* and 6*d* can apply pressure to the laminated waterproof film 3*b* to further secure the lamination. In one embodiment, the upper transport roller 6*c* can include a known water-cooling or air-cooling roller for enhancing the close adherence of the fourth waterproof film 3*b* to the fourth outer surface S4 of the woven fabric 1. This completes the fourth lamination process and the method of producing the cylindrical waterproof bag according to the present invention. As a result, the cylindrical waterproof bag 10 is produced which is composed of the woven fabric 1 laminated with the first through fourth waterproof films 2*a*, 2*b*, 3*a* and 3*b*. FIG. 9 shows a cross-sectional view of the waterproof bag 10, cut along line F—F of FIG. 3B. The waterproof bag 10 is completely laminated with the waterproof films 2*a*, 2*b*, 3*a* and 3*b*, and is without significant projections such as the projections 201 of conventional waterproof bags as shown in FIG. 1.

In one embodiment, the thickness of each of the first through fourth waterproof films 2*a*, 2*b*, 3*a* and 3*b* is about 20 microns so that the application of the third and fourth waterproof films 3*a* and 3*b* onto the end portions of the first and second waterproof films 2*a* and 2*b* would not interfere both aesthetically and functionally with the operation of the first and second waterproof films 2*a* and 2*b* of the waterproof bag 10. In another embodiment, the thickness of the first and second waterproof films 2*a* and 2*b* may be much larger than the thickness of the third and fourth waterproof films 3*a* and 3*b* to provide a substantially-even surface throughout the entire waterproof bag 10. In other embodiments, the thickness of each of the first through fourth waterproof films 2*a*, 2*b*, 3*a* and 3*b* can be selectively varied or be uniform to provide desired aesthetical and/or waterproofing functions.

Between the first through fourth lamination processes, the resultant woven bag/fabric can be wound onto a bobbin until the next lamination process can take place, or it can be supplied directly to the next lamination process. For example, after the first lamination process is completed, the resultant woven fabric 1 can be wound unto a bobbin and then unwound therefrom for the second lamination process at an appropriate time.

Although the preferred embodiments of the present invention have been described above in connection with cylindrically-shaped waterproof bags, the present invention is equally applicable to forming bags of different shapes, sizes, and/or configurations. Further, the present method can be applied to form waterproof objects, other than bags.

In another embodiment, both the first and second lamination processes can be performed simultaneously, and/or both the third and fourth lamination processes can be performed simultaneously. For example, the system 50 can be configured so that both the first and second waterproof films 2*a* and 2*b*, and/or both the third and fourth waterproof films 3*a* and 3*b* can be applied simultaneously. This can further simplify the system since the flipping or rotation of the woven fabric 1 between the first and second lamination processes and between the third and fourth lamination processes can be omitted.

Figure 10:
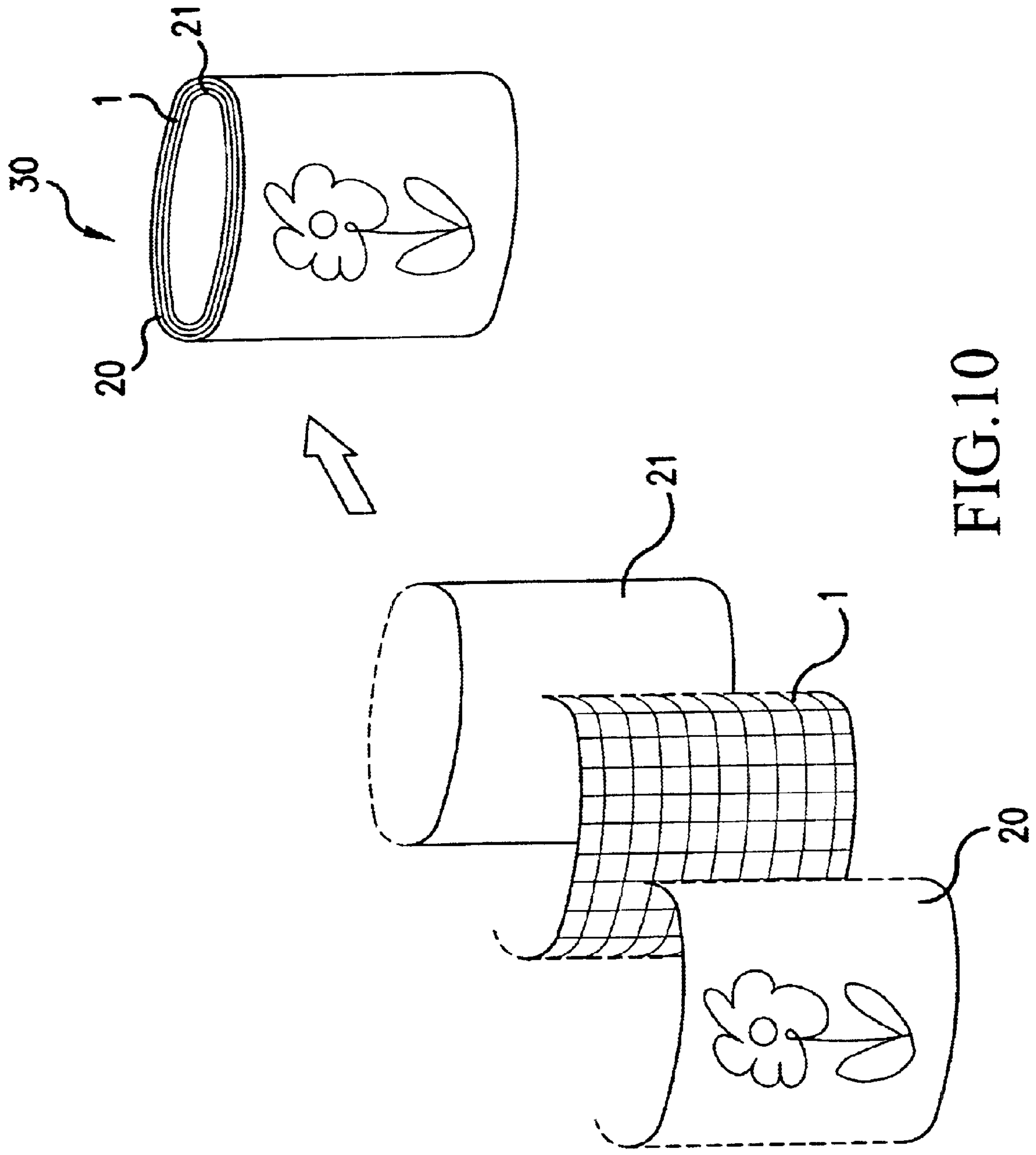
FIG. 10 is a perspective view of a cylindrical waterproof bag according to another embodiment of the present invention.

FIG. 10 is a perspective view of a cylindrical waterproof bag 30 according to another embodiment of the present invention. As shown in FIG. 10, the waterproof bag 30 includes a cylindrical woven fabric 1 which is identical to the woven fabric of the bag 10 of FIG. 2, a waterproof film 21 laminated or coated to the inner surface of the cylindrical woven fabric 1, and a photo film 20 laminated or coated to the outer surface of the cylindrical woven fabric 1. The waterproof film 21 can be in a cylindrical shape to fit within the inner surface of the woven fabric 1, or can be in other shapes to adhere to the inner surface of the woven fabric 1. The waterproof film 21 can be laminated to the woven fabric 1 using existing lamination techniques or the techniques discussed in U.S. Pat. No. 6,105,337 which is herein fully incorporated by reference. The photo film 20 contains an image, graphics, printing, or the like, and can be in a cylindrical shape or other shape suitable for adhering to the outer surface of the cylindrical woven fabric 1. For example, as long as the entire inner surface of the woven fabric 1 is laminated with the waterproof film 21, rendering the entire bag waterproof, it may be unnecessary to coat or laminate the entire outer surface of the woven fabric 1 with the photo film 20. Instead, it may be sufficient to coat or laminate only certain outer portions of the woven fabric 1 with the photo film 20.

Because the cylindrical waterproof bag 30 is made of woven fabric and not vinyl and because of the structure of the bag 30 as discussed above, it is more durable than conventional waterproof bags having printed materials, has good printing quality, and is safer to handle especially since it is without sharp projections such as the projections 201 as shown in FIG. 1.

Accordingly, the present invention provides many advantages over conventional waterproof bags and methods of producing waterproof bags. For example, because of the application of four lamination processes, the waterproof bag is devoid of sharp projections such as the projections 201 (FIG. 1) which often render the bag unsafe to handle. The aesthetics of the waterproof bag is significantly improved by providing substantially uniform outer surfaces for the waterproof bag. Further, the waterproofing function of the bag is significantly improved by providing overlapping layers of waterproof films on the outer surface of a woven fabric, or by providing a waterproof film laminated to the inner surface of the woven fabric. Moreover, the present invention provides waterproof bags with improved printing quality and durability.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A waterproof object comprising:

a tubular base component having first, second, third and fourth longitudinally extending areas of an outer circumferential surface;

first and second waterproof films respectively disposed on the first and second areas of the base component, such that the third and fourth areas are devoid of the first and second waterproof films; and third and fourth waterproof films respectively disposed on the third and fourth areas of the base component and over first and second longitudinally extending edge portions of the first and second waterproof films.

2. The waterproof object of claim 1, wherein the first and second areas of the base component are positioned opposite to each other and have a same width.

3. The waterproof object of claim 2, wherein the third and fourth areas of the base component are positioned opposite to each other and have a same width.

4. The waterproof object of claim 3, wherein the width of the first and second areas of the base component is greater than the width of the third and fourth areas of the base component.

5. The waterproof object of claim 1, wherein the base component is a woven fabric, and the waterproof object is a waterproof bag.

6. The waterproof object of claim 5, wherein the waterproof bag has a cylindrical configuration.

7. The waterproof object of claim 6, wherein the base component is weaved with synthetic resin yarns.

8. The waterproof object of claim 1, further comprising:

a photo film adhered to an outer surface of at least one of the first through fourth waterproof films.

* * * * *